(12) United States Patent
Yonaha et al.

(10) Patent No.: US 8,493,476 B2
(45) Date of Patent: Jul. 23, 2013

(54) IMAGE CAPTURING APPARATUS, IMAGE CAPTURING METHOD, AND COMPUTER READABLE MEDIUM STORING THEREIN PROGRAM

(75) Inventors: Makoto Yonaha, Ashigarakami-gun (JP); Hirokazu Kameyama, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 154 days.

(21) Appl. No.: 12/887,171

(22) Filed: Sep. 21, 2010

(65) Prior Publication Data

US 2011/0007185 A1 Jan. 13, 2011

Related U.S. Application Data

(63) Continuation of application No. PCT/JP2009/001488, filed on Mar. 31, 2009.

(30) Foreign Application Priority Data

Mar. 31, 2008 (JP) .................................. 2008-091506
Feb. 23, 2009 (JP) .................................. 2009-039508

(51) Int. Cl.
*H04N 5/262* (2006.01)
*H04N 5/235* (2006.01)
*H04N 5/225* (2006.01)
*H04N 7/12* (2006.01)
*G06K 9/00* (2006.01)
*G06K 9/32* (2006.01)

(52) U.S. Cl.
USPC ..... 348/239; 348/221.1; 348/362; 348/220.1; 382/299; 382/248; 382/164; 375/240.25; 375/240.26

(58) Field of Classification Search
USPC ............. 348/239, 229.1, 223.1, 222.1, 224.1, 348/231.99, 234–235, 220.1, 221.1, 345, 348/346, 333.01–333.02, 333.11–333.12, 348/362, 45, 169; 382/299, 166, 164, 232, 382/235, 244, 189, 302, 233, 148; 725/105; 375/240.25, 240.26

See application file for complete search history.

(56) References Cited

U.S. PATENT DOCUMENTS 6,097,842 A * 8/2000 Suzuki et al. ................. 382/232
7,233,350 B2 * 6/2007 Tay .......................... 348/231.99

(Continued)

FOREIGN PATENT DOCUMENTS

JP 11168659 A 6/1999
JP 2000287200 A 10/2000

(Continued)

OTHER PUBLICATIONS

Notification of reasons for refusal, dated Nov. 27, 2012, issued in corresponding JP Application No. 2009-039508, 5 pages in English and Japanese.

(Continued)

*Primary Examiner* — Nhan T Tran
*Assistant Examiner* — Marly Camargo
(74) *Attorney, Agent, or Firm* — Sughrue Mion, PLLC

(57) ABSTRACT

The present invention provides a video in which a subject image looks clear while reducing the amount of transmitted data. An image capturing apparatus includes: an image capturing section that successively captures a plurality of images under a plurality of image capturing conditions different from each other; an image generating section that generates an output image by overlapping the plurality of captured images captured under the plurality of image capturing conditions; and an output section that outputs the output image generated by the image generating section. The image capturing section may successively capture the plurality of images by means of exposure in different exposure time lengths from each other. The image capturing section may successively capture the plurality of images also by means of exposure in different aperture openings from each other.

21 Claims, 13 Drawing Sheets

U.S. PATENT DOCUMENTS

| | | | |
|---|---|---|---|
| 7,978,254 B2 * | 7/2011 | Katsumata | 348/345 |
| 2002/0141002 A1 * | 10/2002 | Takano et al. | 358/513 |
| 2003/0112341 A1 * | 6/2003 | Aoki | 348/223.1 |
| 2003/0142745 A1 | 7/2003 | Osawa | |
| 2004/0070778 A1 * | 4/2004 | Matama | 358/1.9 |
| 2007/0177035 A1 | 8/2007 | Hatano et al. | |

FOREIGN PATENT DOCUMENTS

| | | |
|---|---|---|
| JP | 2002044516 A | 2/2002 |
| JP | 2006-054921 A | 2/2006 |
| JP | 2006-245909 A | 9/2006 |
| JP | 2007-201985 A | 8/2007 |

OTHER PUBLICATIONS

The Second Office Action, dated Dec. 13, 2012, issued in corresponding CN Application No. 200980106049.2, 14 pages in English and Chinese.

* cited by examiner

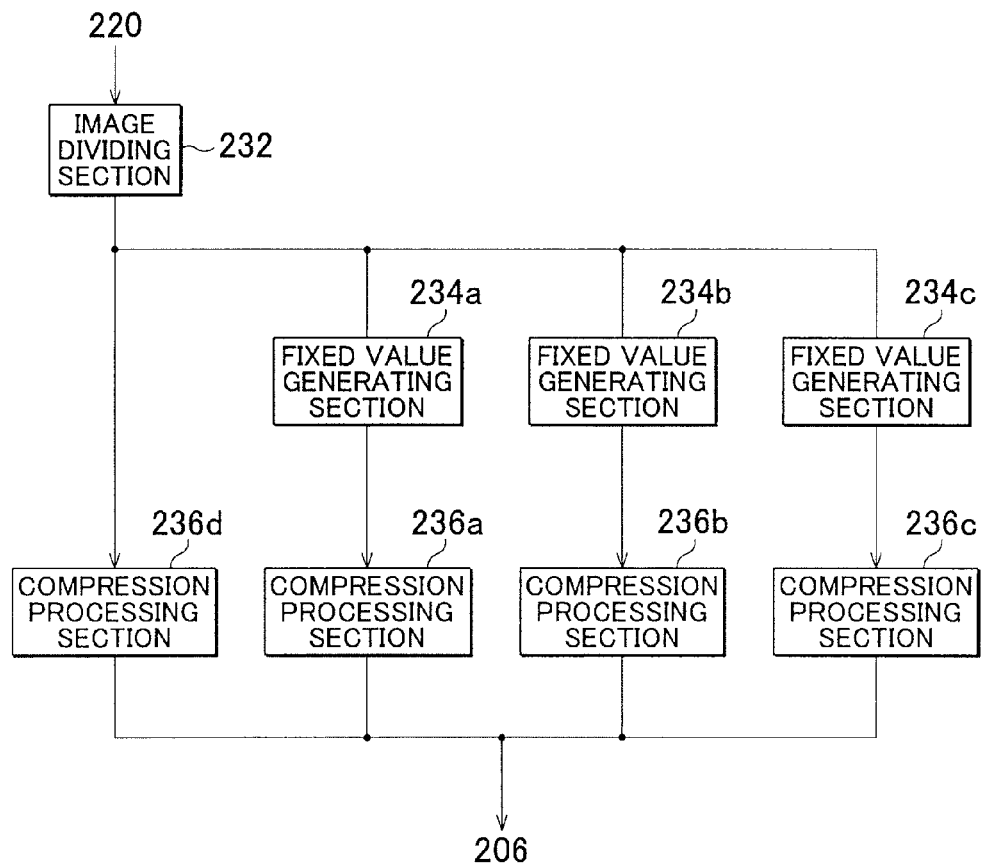
F I G . 3

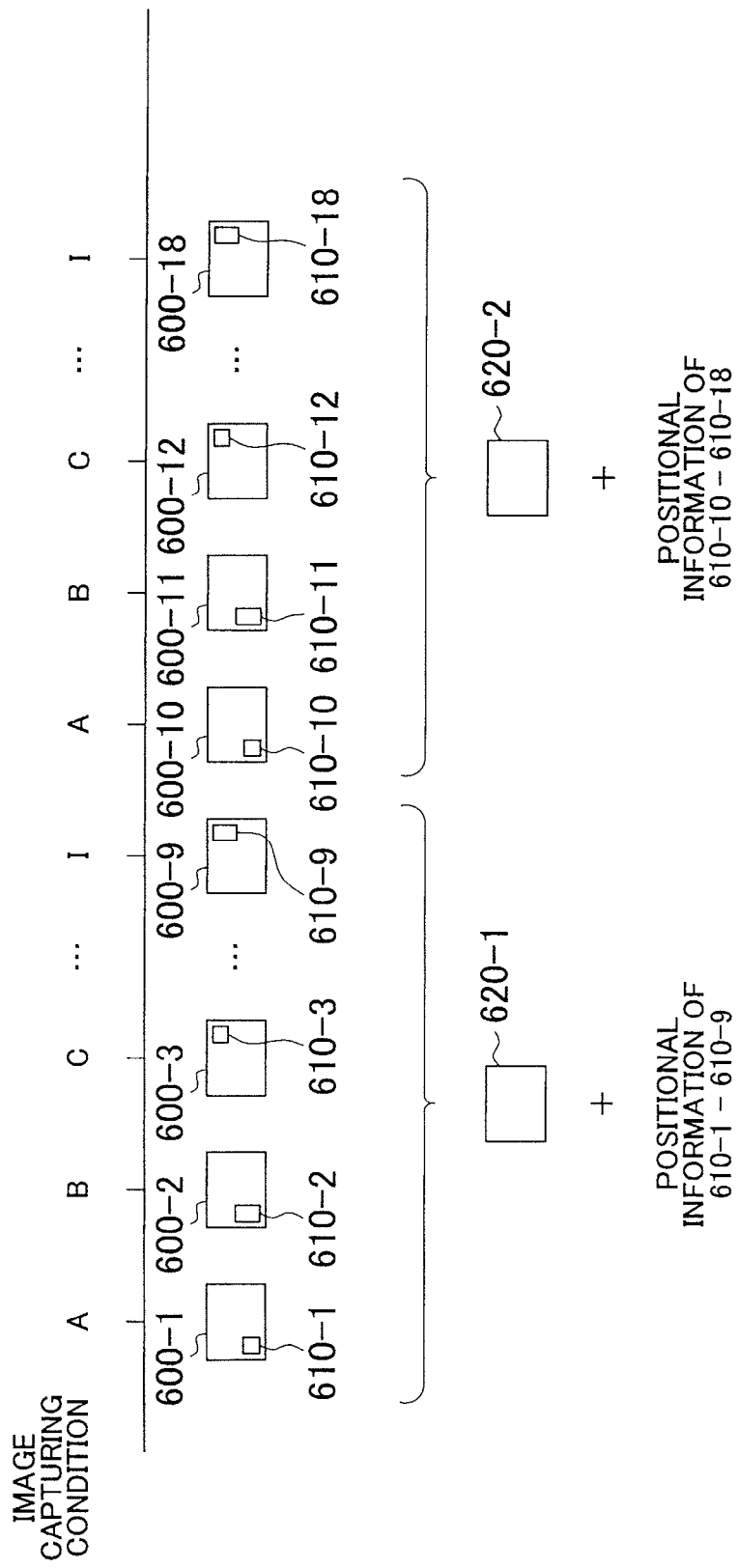
F I G. 6

| IMAGE CAPTURING CONDITION | EXPOSURE TIME | DIAPHRAGM VALUE |
|---|---|---|
| A | T/16 | $\frac{F}{4}$ |
| B | T/8 | $\frac{F}{2\sqrt{2}}$ |
| C | T/4 | $\frac{F}{2}$ |
| D | T/2 | $\frac{F}{\sqrt{2}}$ |
| E | T | F |
| F | 2T | $\sqrt{2}F$ |
| G | 4T | 2F |
| H | 8T | $2\sqrt{2}F$ |
| I | 16T | 4F |

FIG. 7

| IMAGE CAPTURING CONDITION | EXPOSURE TIME | DIAPHRAGM VALUE |
|---|---|---|
| A | T/2 | F/2 |
| B | T/2 | F |
| C | T/2 | 2F |
| D | T | F/2 |
| E | T | F |
| F | T | 2F |
| G | 2T | F/2 |
| H | 2T | F |
| I | 2T | 2F |

FIG. 9

| IMAGE CAPTURING CONDITION | EXPOSURE TIME | DIAPHRAGM VALUE | GAIN CHARACTERISTIC |
|---|---|---|---|
| A | T/2 | F/2 | UNDER |
| B | T/2 | F/2 | NORMAL |
| C | T/2 | F/2 | OVER |
| D | T/2 | F | UNDER |
| E | T/2 | F | NORMAL |
| F | T/2 | F | OVER |
| G | T/2 | 2F | UNDER |
| H | T/2 | 2F | NORMAL |
| I | T/2 | 2F | OVER |
| J | T | F/2 | UNDER |
| ⋮ | ⋮ | ⋮ | ⋮ |

FIG. 10

| IMAGE CAPTURING CONDITION | IMAGE CAPTURING PARAMETER | | OPERATION PARAMETER | | | | | | | | |
|---|---|---|---|---|---|---|---|---|---|---|---|
| | EXPOSURE TIME | DIAPHRAGM VALUE | a | b | c | d | e | f | g | h | i |
| A | 4T | F | 1 | 1 | 0 | 1 | 2 | 2 | 8 | 0 | 0 |
| B | 4T | √2F | 1 | 2 | 0 | 2 | 1 | 4 | 4 | 1 | 0 |
| C | 4T | 2F | 1 | 4 | 1 | 4 | 0 | 8 | 2 | 2 | 0 |
| D | 2T | F | 1 | 2 | 0 | 2 | 4 | 1 | 4 | 1 | 1 |
| E | 2T | √2F | 1 | 4 | 1 | 4 | 2 | 2 | 2 | 2 | 0 |
| F | 2T | 2F | 1 | 8 | 0 | 2 | 1 | 4 | 1 | 4 | 1 |
| G | T | F | 1 | 4 | 1 | 4 | 8 | 0 | 2 | 2 | 1 |
| H | T | √2F | 1 | 8 | 0 | 2 | 4 | 1 | 1 | 4 | 1 |
| I | T | 2F | 1 | 16 | 0 | 1 | 2 | 2 | 0 | 8 | 1 |
| DIVIDING COEFFICIENT | | | 9 | 49 | 3 | 22 | 24 | 24 | 24 | 24 | 6 |

FIG. 11

IMAGE CAPTURING APPARATUS, IMAGE CAPTURING METHOD, AND COMPUTER READABLE MEDIUM STORING THEREIN PROGRAM

BACKGROUND

1. Technical Field

The present invention relates to an image capturing apparatus, an image capturing method, and a computer readable medium storing therein a program. The contents of the following Japanese patent applications are incorporated herein by reference, No. 2008-091506 filed on Mar. 31, 2008, and No. 2009-039508 filed on Feb. 23, 2009.

2. Description of the Related Art

A video signal transceiver system is known in which a long-time exposure video and a short-time exposure video are separately compressed to be transmitted at the side of the camera, and the transmitted two types of data are separately expanded and combined at an arbitrary ratio to be displayed as a wide dynamic range video at the receiver side (e.g., Patent Document No. 1). In addition, a monitoring image capturing apparatus is also known which separately captures an image of a plurality of subjects having different luminance and in different positions in a screen, at respectively different exposure times, and outputs the plurality of subject images as separate video signals having adequate exposure (e.g., Patent Document No. 2). In addition, a playback system is known which captures and displays a series of sequential video images at least at first and second exposure times different from each other (e.g., Patent Document No. 3).

In the above explanation, Patent Document No. 1 is Japanese Patent Application Publication No. 2006-54921, Patent Document No. 2 is Japanese Patent Application Publication No. 2005-5893, and Patent Document No. 3 is Japanese Patent Application Publication No. 2005-519534 (translation of PCT application).

SUMMARY

However, the images respectively captured at long and short exposure times are outputted according to the technologies of the above-cited patent documents, which may increase the outputted data amount. Moreover, even when the image of each region cannot be captured under the optimal condition, a video in which the subject image appears clear cannot be provided even by combining the images subjected to different exposure times from each other, for each region.

So as to solve the stated problems, according to a first aspect of the innovations herein, provided is an image capturing apparatus including: an image capturing section that successively captures a plurality of images under a plurality of image capturing conditions different from each other; an image generating section that generates an output image by overlapping the plurality of captured images captured under the plurality of image capturing conditions; and an output section that outputs the output image generated by the image generating section.

According to a second aspect of the innovations herein, provided is an image capturing method including: successively capturing a plurality of images under a plurality of image capturing conditions different from each other; generating an output image by overlapping the plurality of captured images captured under the plurality of image capturing conditions; and outputting the generated output image.

According to a third aspect of the innovations herein, provided is a computer readable medium storing therein a program for an image capturing apparatus, the program causing the computer to function as: an image capturing section that successively captures a plurality of images under a plurality of image capturing conditions different from each other; an image generating section that generates an output image by overlapping the plurality of captured images captured under the plurality of image capturing conditions; and an output section that outputs the output image generated by the image generating section.

The summary of the invention does not necessarily describe all necessary features of the present invention. The present invention may also be a sub-combination of the features described above.

BRIEF DESCRIPTION OF THE DRAWINGS

FIG. 3 shows an example of a block configuration of a compression section 230.

FIG. 6 shows an example of an output image generated from a captured image 600.

FIG. 7 shows an example of image capturing conditions A-I.

FIG. 9 shows another example of the image capturing conditions.

FIG. 10 shows a further different example of the image capturing conditions.

FIG. 11 shows an example of an operation parameter used in overlapping processing.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
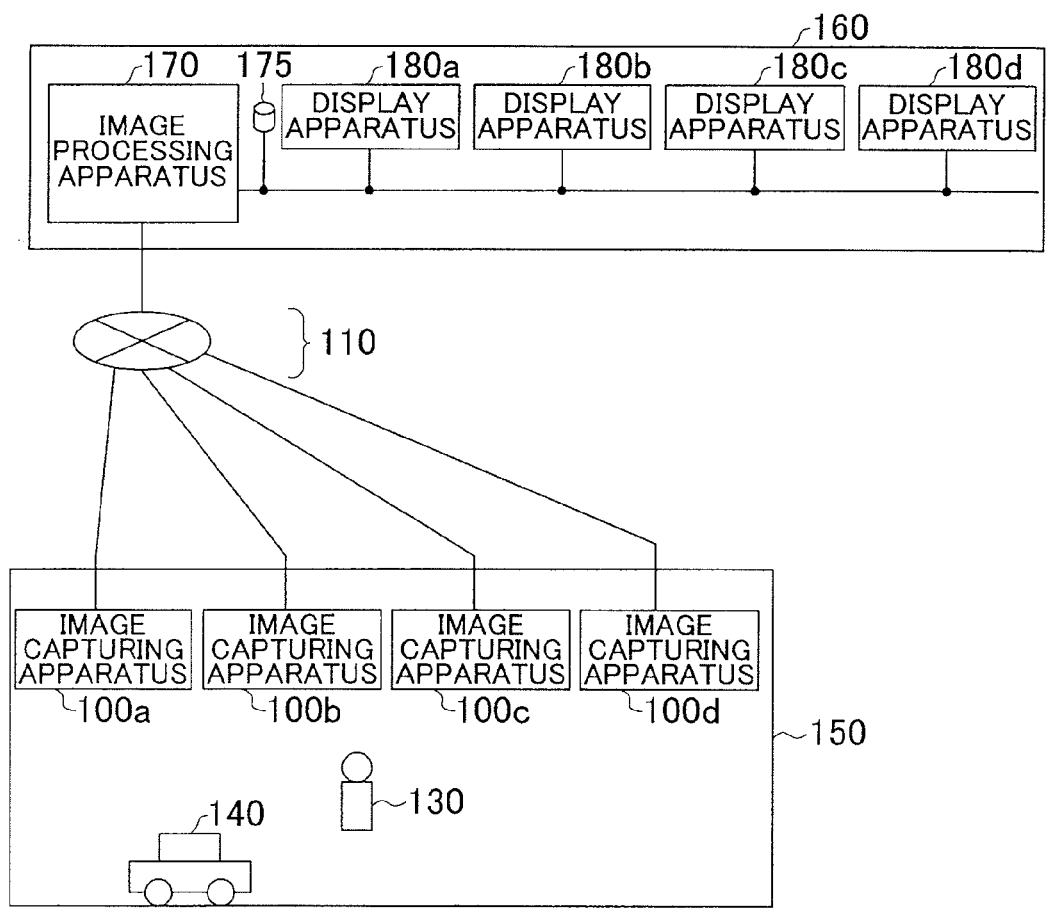
FIG. 1 shows an example of an image capturing system 10 according to an embodiment.

FIG. 1 shows an example of an image capturing system 10 according to an embodiment. The image capturing system 10 can function as a monitoring system as explained below.

The image capturing system 10 includes a plurality of image capturing apparatuses 100a-d (hereinafter collectively referred to as "image capturing apparatus 100") for capturing an image of a monitor target space 150, a communication network 110, an image processing apparatus 170, an image DB 175, and a plurality of display apparatuses 180a-d (hereinafter collectively referred to as "display apparatus 180"). Note that the image processing apparatus 170 and the display apparatus 180 are provided in a space 160 different from the monitor target space 150.

The image capturing apparatus 100a generates a moving image including a plurality of captured images, by capturing the image of the monitor target space 150. The image capturing apparatus 100a captures the images successively under different image capturing conditions. The image capturing apparatus 100a generates a small number of output images as much as possible, by causing to overlap the images captured under different image capturing conditions. The image capturing apparatus 100 then transmits a monitoring moving image including a plurality of number of output images, to the image processing apparatus 170 via a communication network 110.

The image capturing apparatus 100a can enhance the probability of obtaining a clear subject image, by capturing the images by changing the image capturing condition. Therefore the image capturing apparatus 100a can provide a monitoring image including image information of a clear subject image, while reducing the data amount.

Note that the image capturing apparatus 100a detects, from a captured moving image, a plurality of characteristic regions having respectively different types of characteristics, e.g., a region in which a person 130 is captured, a region in which a moving body 140 such as a vehicle is captured, etc. Then, the image capturing apparatus 100a compresses the moving image to generate compressed moving image data in which each of the plurality of characteristic regions is rendered in higher image quality than the regions other than the characteristic regions (hereinafter occasionally referred to as "non-characteristic region"). Note that the image capturing apparatus 100a generates the compressed moving image data so that the images of the characteristic regions are rendered in image qualities according to their respective degrees of importance. Then, the image capturing apparatus 100a transmits the compressed moving image data to the image processing apparatus 170 via the communication network 110, in association with characteristic region information that is information identifying a characteristic region.

The image capturing apparatus 100b, the image capturing apparatus 100c, and the image capturing apparatus 100d have the same function and operation as that of the image capturing apparatus 100a. Therefore, the function and operation of the image capturing apparatus 100b, the image capturing apparatus 100c, and the image capturing apparatus 100d is not explained below.

The image processing apparatus 170 receives the compressed moving image data associated with the characteristic region information, from the image capturing apparatus 100. The image processing apparatus 170 generates a moving image for display by expanding the received compressed moving image data using the associated characteristic region information, and supplies the generated moving image for display to the display apparatus 180. The display apparatus 180 displays the moving image for display, supplied from the image processing apparatus 170.

In addition, the image processing apparatus 170 may record, in the image DB 175, the compressed moving image data in association with the characteristic region information associated therewith. Then, the image processing apparatus 170 may read the compressed moving image data and the characteristic region information from the image DB 175 in response to a request by the display apparatus 180, generate a moving image for display by expanding the read compressed moving image data using the characteristic region information, and supply the generated moving image for display, to the display apparatus 180.

The characteristic region information may be text data that includes the position, the size, the number of the particular characteristic region(s), and identification information identifying the captured image from which the characteristic region has been detected, or may be data generated by providing various processes such as compression and encryption to the text data. The image processing apparatus 170 identifies the captured image satisfying a various types of search conditions, based on the position, the size, the number of the particular characteristic region(s), or the like, included in the characteristic region information. The image processing apparatus 170 may decode the identified captured image and supply it to the display apparatus 180.

In this way, by recording the characteristic regions in association with a moving image, the image capturing system 10 can quickly find and random access the captured image, in the moving image, which matches a predetermined condition. Moreover, by decoding only the captured image matching a predetermined condition, the image capturing system 10 is able to display a partial moving image matching the predetermined condition quickly in response to a playback instruction.

Figure 2:
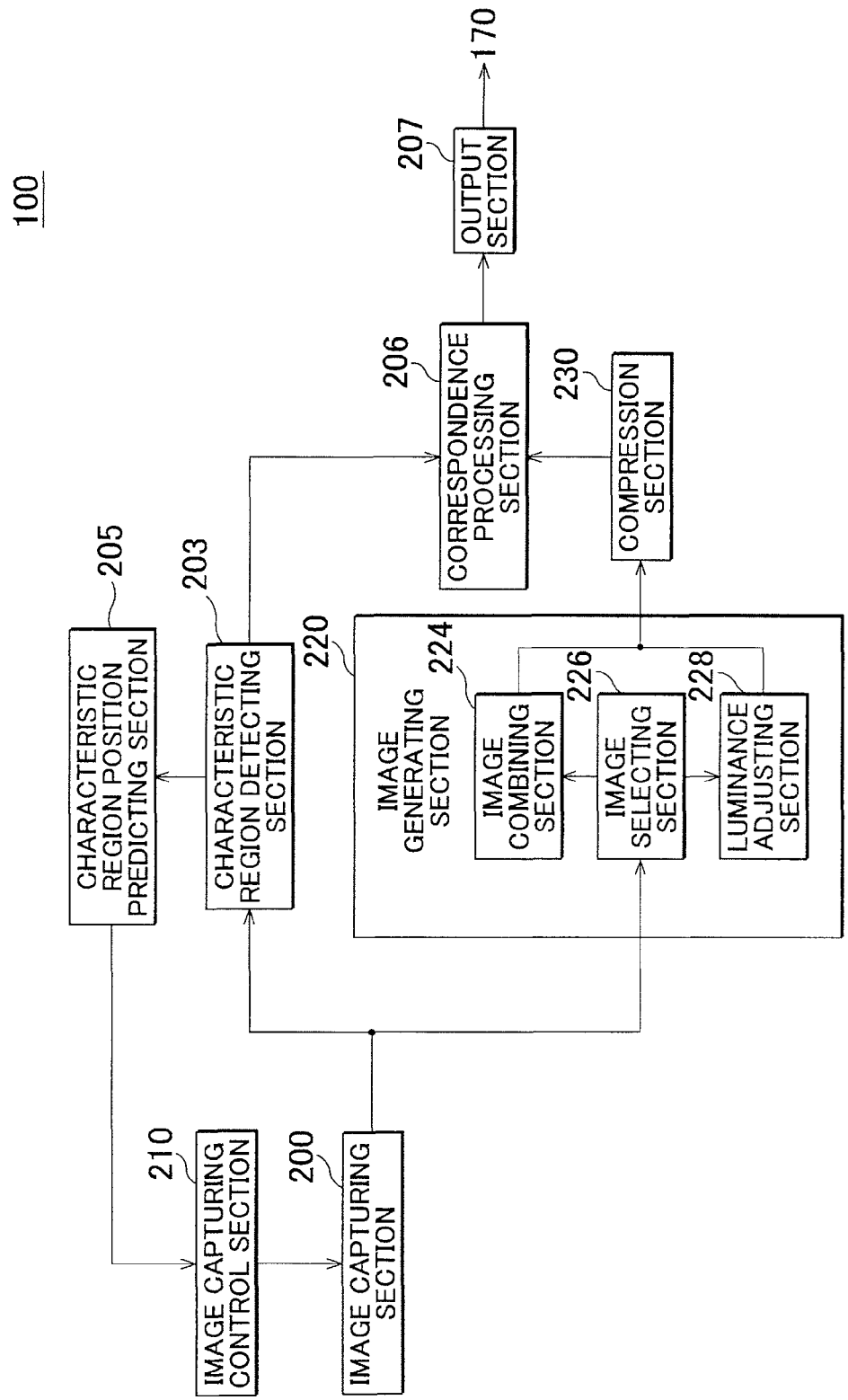
FIG. 2 shows an example of a block configuration of an image capturing apparatus 100.

FIG. 2 shows an example of a block configuration of an image capturing apparatus 100. The image capturing apparatus 100 includes an image capturing section 200, a characteristic region detecting section 203, a characteristic region position predicting section 205, a correspondence processing section 206, an output section 207, an image capturing control section 210, an image generating section 220, and a compression section 230. The image generating section 220 includes an image combining section 224, an image selecting section 226, and a luminance adjusting section 228.

The image capturing section 200 successively captures a plurality of images under a plurality of image capturing conditions different from each other. Specifically, under control of an image capturing control section 210 to change the image capturing condition of the image capturing section 200, the image capturing section 200 successively captures a plurality of images under a plurality of image capturing conditions.

Note that the image capturing section 200 may successively perform image capturing at a frame rate higher than a predetermined reference frame rate. For example, the image capturing section 200 may perform image capturing at a frame rate higher than the display rate at which the display apparatus 180 can perform display. The image capturing section 200 may also perform successive image capturing at a frame rate higher than a predetermined reference frame rate according to the motion speed of the target to be monitored. Note that the captured image may be a frame image or a field image.

Specifically, the image capturing section 200 successively captures a plurality of images through exposure in different exposure times different in time length from each other. More specifically, the image capturing section 200 exposes the light receiving section included in the image capturing section 200, at exposure times different in time length from each other. In addition, the image capturing section 200 may successively capture a plurality of images through exposure in different aperture openings from each other. In addition, the image capturing section 200 may successively capture a plurality of images through exposure in exposure time and aperture opening set to yield the same amount of exposure.

Still alternatively, the image capturing section 200 may successively capture a plurality of images having different resolutions from each other. In addition, the image capturing section 200 may successively capture a plurality of images having a different number of colors from each other. Still alternatively, the image capturing section 200 may successively capture a plurality of images having focused on different positions from each other.

The characteristic region detecting section 203 detects a characteristic region from each of a plurality of captured images. Specifically, the characteristic region detecting section 203 detects a characteristic region from a moving image including a plurality of captured images. For example, the characteristic region detecting section 203 may detect, as a characteristic region, a region including a moving object from a moving image. Note that as detailed later, the characteristic region detecting section 203 may detect, as a characteristic region, a region including a characteristic object from a moving image.

Note that the characteristic region detecting section 203 may detect a plurality of characteristic regions whose characteristic type is different from each other, from a moving image. Here, the characteristic type may use the type of an object as an index (e.g., a person, a moving body). The type of an object may be determined based on the degree of matching of the shape or the color of an object.

For example, the characteristic region detecting section 203 may extract, from each of a plurality of captured images, an object that matches a predetermined shape pattern at a degree equal to or greater than a predetermined matching degree, and detect the regions in the captured images that include the extracted object, as characteristic regions having the same characteristic type. Note that a plurality of shape patterns may be determined for each characteristic type. An example of shape pattern is a shape pattern representing a face of a person. Note that a plurality of face patterns may be determined for each person. Accordingly, the characteristic region detecting section 203 may detect regions respectively including different persons, as characteristic regions different from each other.

In this way, the characteristic region detecting section 203 can detect a characteristic region from images successively captured under different image capturing conditions from each other. This reduces the probability of failing to detect a characteristic region. For example, an object representing a moving body moving in high speed is usually easier to detect from an image captured through exposure in a short exposure time, compared to a captured image obtained through exposure at a long exposure time. Because the image capturing section 200 successively captured images by changing the exposure time length as explained above, the image capturing system 10 can lower the probability of failing to detect a moving body moving in high speed.

The characteristic region position predicting section 205, based on the position of the characteristic region detected from each of a plurality of captured images, predicts the position of a characteristic region at a time later than the timing at which the plurality of captured images have been captured. Then, the image capturing section 200 may successively capture a plurality of images by focusing on the predicted position of the characteristic region having been predicted by the characteristic region position predicting section 205. Specifically, the image capturing control section 210 aligns the focus position of the image capturing performed by the image capturing section 200, to the position of the characteristic region predicted by the characteristic region position predicting section 205.

The image generating section 220 generates an output image by overlapping the plurality of images captured under a plurality of image capturing conditions different from each other. Specifically, the image combining section 224 generates a single output image by overlapping the plurality of images captured under a plurality of image capturing conditions different from each other. More specifically, the image generating section 220 generates a single output image by averaging the pixel values of the plurality of captured images. Note that the image combining section 224 generates a first output image from a plurality of images captured under a plurality of image capturing conditions different from each other in a first period. Moreover, the image combining section 224 generates a first output image from a plurality of images captured under a plurality of image capturing conditions for a second period, where the plurality of image capturing conditions being same as the plurality of image capturing conditions adopted in the first period.

In this way, the image generating section 220 generates an output image in which the images captured under different image capturing conditions are combined. According to such a configuration that the image capturing section 200 captures the images under different image capturing conditions, the subject can have a greater probability of being captured clearly in any of the captured images. This enables the image capturing system 10 to combine the clearly captured image with the other captured images, to look clear to human eyes.

Note that the image selecting section 226 selects, for each of a plurality of image regions, a captured image including the image region that matches a predetermined condition, from among a plurality of captured images. For example, the image selecting section 226 selects, for each of a plurality of image regions, a captured image including the image region that is brighter than a predetermined brightness. Alternatively, the image selecting section 226 selects, for each of a plurality of image regions, a captured image including the image region that has a contrast value larger than a predetermined contrast value. In this way, the image selecting section 226 selects, for each of a plurality of image regions, a captured image including a subject captured in the best condition, from a plurality of captured images. Then, the image combining section 224 may generate an output image by combining the images of the plurality of image regions in the selected captured images.

In this way, the image generating section 220 generates a plurality of output images from the plurality of captured images respectively captured in different periods by the image capturing section 200. The compression section 230 compresses the output image resulting from combining performed by the image combining section 224. Note that the compression section 230 may also compress the plurality of output images. For example, the compression section 230 MPEG compresses the plurality of output images.

The output image(s) compressed by the compression section 230 is/are supplied to the correspondence processing section 206. Note that a moving image including a plurality of output moving images may be a moving image having a frame rate substantially equal to the display rate at which the display apparatus 180 can perform display. Note that the image capturing section 200 may perform image capturing at an image capturing rate larger than a value obtained by multiplying the number of image capturing conditions to be changed, by the display rate.

The correspondence processing section 206 associates the output image(s) supplied from the compression section 230 with characteristic region information representing the characteristic region detected by the characteristic region detecting section 203. For example, the correspondence processing section 206 assigns, to the compressed moving image, the characteristic region information associated with information identifying the output image(s), the information identifying the position of the characteristic region, and the information identifying the characteristic type of the characteristic region. Then, the output section 207 outputs the output image assigned the characteristic region information, to the image processing apparatus 170. Specifically, the output section 207 transmits the output image assigned the characteristic region information, to the communication network 110 destined to the image processing apparatus 170.

In this way, the output section 207 outputs the characteristic region information representing the characteristic region detected by the characteristic region detecting section 203, in association with the output image. Note that the output section 207 may also output an output moving image including a plurality of output images as moving image constituting images, respectively.

Note that the output image generated by the image generating section 220 and outputted from the output section 207 may be displayed in the display apparatus 180 as a monitoring image. By transmitting an output image in which a plurality of captured images are combined, to the image processing apparatus 170 via the communication network 110, the image capturing system 10 can reduce the amount of data, compared to the case of transmitting the plurality of captured images without combining them. As described above, the object included in the output image is easy to be recognized as a clear image by human eyes, the image capturing system 10 can provide a monitoring image meaningful both in terms of the data amount and the visual recognition.

As described above, the image combining section 224 can generate an output image easy to be recognized by human eyes. On the other hand, it is desirable that the observers can monitor the monitor target space 150, particularly with respect to a characteristic region containing a characteristic object such as a person, as an image having an image quality equal to that of the captured image.

For achieving such a purpose, the compression section 230 compresses a plurality of captured images by controlling the image quality of the image of the background region that is a non-characteristic region of the plurality of captured images to be lower than the image quality of the image of the characteristic region of the plurality of captured images. In this way, the compression section 230 compresses each of the plurality of captured images, in different degrees between the characteristic region in the plurality of captured images and the background region that is a non-characteristic region in the plurality of captured images. The output section 207 may further output an image resulting compression performed by the compression section 230. In this way, the output section 207 outputs the monitoring moving image formed from a plurality of output images as well as a captured moving image including a plurality of compressed captured images.

Note that the compression section 230 may compress captured images by trimming the non-characteristic regions. For pursuing this operation, the output section 207 sends the captured image after trimming to the communication network 110, together with the combined output images.

In addition, the compression section 230 may compress the moving image including a plurality of images captured under different image capturing conditions from each other. Then, the output section 207 outputs the moving image including the plurality of captured images compressed by the compression section 230, together with the plurality of combined output images. In this way, the output section 207 outputs the moving image in which the plurality of images captured under different image capturing conditions are successively displayed.

When the image capturing section 200 captures images by changing the image capturing condition, the possibility that the subject is captured clearly in any of the captured images will increase, and also the possibility of generating many images in which the same subject is not clear will increase. However, when such a plurality of captured images are displayed as frames of a moving image successively, the subject image may look clear to human eyes if there is one frame in which the subject image is clear. Therefore, the image capturing system 10 can provide a moving image suitable as a monitoring image.

Note that the compression section 230 may compress moving images, each of which includes a plurality of captured images as moving image constituting images, which have been captured under an image capturing condition different from the other moving images. The output section 207 may output the plurality of moving images respectively compressed by the compression section 230.

More specifically, the compression section 230 pursues the compression based on a comparison result of comparing the image content of each of the plurality of captured images included as moving image constituting images of a moving image with the image content of the other captured images included as moving image constituting images of the moving image. More specifically, the compression section 230 pursues the compression by calculating a difference between each of the plurality of captured images included as moving image constituting images of a moving image and the other captured images included as moving image constituting images of the moving image. For example, the compression section 230 pursues the compression by calculating a difference between each of the plurality of captured images included as moving image constituting images of a moving image and a predicted image generated from the other captured images.

The difference in image content is usually smaller for the images captured under the same condition is usually smaller than for the images captured under different conditions from each other. Therefore, because the compression section 230 classifies the captured images according to each image capturing condition to treat captured images of different image capturing conditions from each other as different streams of moving images from each other, the compression ratio can improve compared to a case of compressing the plurality of captured images captured under different image capturing conditions from each other as a moving image.

Note that the output section 207 may output a plurality of captured images in association with the image capturing conditions under which they are captured. Accordingly, the image processing apparatus 170 can detect, with high level of accuracy, the characteristic region again using a detection parameter according to the image capturing condition.

Note that the image selecting section 226 selects, from among a plurality of captured images, a plurality of captured images matching a predetermined condition. The compression section 230 compresses the plurality of captured images selected by the image selecting section 226. In this way, the output section 207 can output a moving image for successively displaying the plurality of captured images that match a predetermined condition. Note that the image selecting section 226 may select, from among a plurality of captured images, a plurality of captured images that are clearer than a predetermined value. The image selecting section 226 may also select, from among a plurality of captured images, a plurality of captured images including a larger number of characteristic regions than a predetermined value.

Note that the output section 207 may output the plurality of moving images compressed by the compression section 230, in association with timing information representing a timing at which each of the plurality of captured images included as moving image constituting images in the plurality of moving images compressed by the compression section 230 is to be displayed. The output section 207 may output the plurality of moving images compressed by the compression section 230, in association with timing information representing a timing at which each of the plurality of captured images included as moving image constituting images in the plurality of moving images compressed by the compression section 230 has been captured. The output section 207 may then output information in which identification information (e.g., frame number) identifying a captured image as a moving image constituting image is associated with the timing information. The output section 207 may also output characteristic region information representing the characteristic region detected from each of the plurality of captured images, in association with each of the plurality of captured images.

The luminance adjusting section 228 adjusts the luminance of captured images, so as to substantially equalize the image brightness across a plurality of captured images. For example, the luminance adjusting section 228 adjusts the luminance of a plurality of captured images so as to substantially equalize the brightness of the image of the characteristic region throughout the plurality of captured images. The compression section 230 may then compress the captured images whose luminance has been adjusted by the luminance adjusting section 228.

The output section 207 outputs the characteristic region information representing the characteristic region detected from each of the plurality of captured images, in association with each of the plurality of captured images whose luminance has been adjusted by the luminance adjusting section 228. By image capturing by the image capturing section 200 under chronologically changed image capturing conditions, the luminance of the captured images may change chronologically. The image capturing system 10 can reduce the flickering when the plurality of captured images are watched as a moving image, by the luminance adjustment performed by the luminance adjusting section 228.

FIG. 3 shows an example of a block configuration of the compression section 230. The compression section 230 includes an image dividing section 232, a plurality of fixed value generating section 234a-c (hereinafter occasionally collectively referred to as "fixed value generating section 234") and a plurality of compression processing sections 236a-d (hereinafter occasionally collectively referred to as "compression processing section 236").

The image dividing section 232 divides characteristic regions from background regions other than the characteristic regions, in the plurality of captured images. Specifically, the image dividing section 232 divides each of a plurality of characteristic regions from background regions other than the characteristic regions, in the plurality of captured images. The image dividing section 232 divides characteristic regions from background regions in each of the plurality of captured images. The compression processing section 236 compresses a characteristic region image that is an image of a characteristic region and a background region image that is an image of a background region, in respectively different degrees. Specifically, the compression processing section 236 compresses a characteristic region moving image including a plurality of characteristic region images and a background region moving image including a plurality of background region images, in respectively different degrees.

Specifically, the image dividing section 232 divides a plurality of captured images to generate a characteristic region moving image for each of a plurality of characteristic types. The fixed value generating section 234 generates a fixed value of a pixel value of the non-characteristic region of each characteristic type, for each of the characteristic region images included in the plurality of characteristic region moving images generated for each characteristic type. Specifically, the fixed value generating section 234 sets the pixel value of the non-characteristic region to a predetermined pixel value. The compression processing section 236 compresses the plurality of characteristic region moving images for each characteristic type. For example, the compression processing section 236 MPEG compresses the plurality of characteristic region moving images for each characteristic type.

The fixed value generating section 234a, the fixed value generating section 234b, and the fixed value generating section 234c respectively generate a fixed value of a characteristic region moving image of a first characteristic type, a fixed value of a characteristic region moving image of a second characteristic type, and a fixed value of a characteristic region moving image of a third characteristic type. Then, the compression processing section 236a, the compression processing section 236b, and the compression processing section 236c respectively compress the characteristic region moving image of the first characteristic type, the characteristic region moving image of the second characteristic type, and the characteristic region moving image of the third characteristic type.

Note that the compression processing sections 236a-c compress the characteristic region moving image at a predetermined degree according to each characteristic type. For example, the compression processing section 236 may convert the characteristic region moving image into predetermined resolutions pre-set for each characteristic type, and compress the converted characteristic region moving image. Also for compressing a characteristic region moving image according to MPEG coding, the compression processing section 236 may compress the characteristic region moving image using a quantization parameter pre-set for each characteristic type.

Note that the compression processing section 236d compresses a background region moving image. Note that the compression processing section 236d may compress the background region moving image at a degree larger than the degree of any of the compression processing sections 236a-c. The characteristic region moving image and the background region moving image compressed by the compression processing section 236 are supplied to the correspondence processing section 206.

Since the fixed value generating section 234 has already generated fixed values for the non-characteristic regions, in prediction coding for example by MPEG coding, the compression processing section 236 can substantially decrease the amount of image differences between the regions other than the characteristic regions and the predicted image. This helps substantially enhance the compression ratio of a characteristic region moving image.

Figure 4:
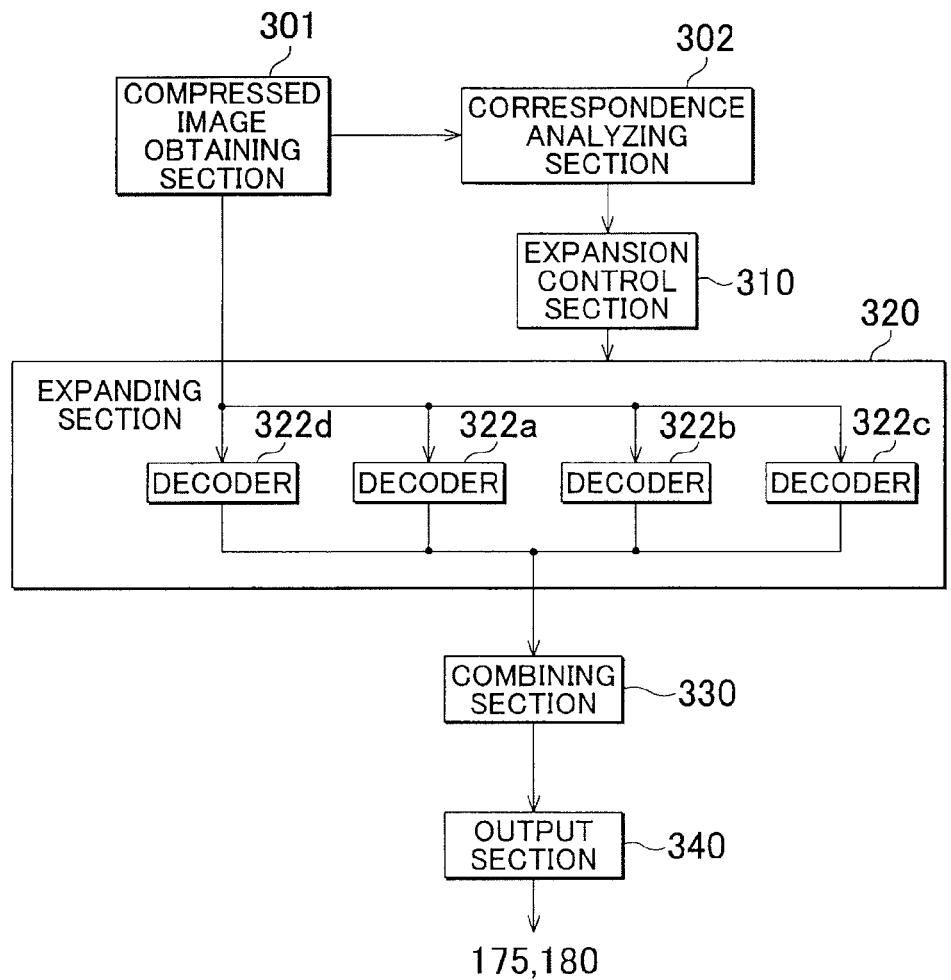
FIG. 4 shows an example of a block configuration of an image processing apparatus 170.

FIG. 4 shows an example of a block configuration of an image processing apparatus 170. This drawing shows a block configuration of the image processing apparatus 170 for expanding the captured moving images including the plurality of captured images compressed for each region.

The image processing apparatus 170 includes a compressed image obtaining section 301, a correspondence analyzing section 302, an expansion control section 310, an expanding section 320, a combining section 330, and an output section 340. The compressed image obtaining section 301 obtains a compressed moving image including a captured image compressed by the compression section 230. Specifically, the compressed image obtaining section 301 obtains a compressed moving image including a plurality of characteristic region moving images and a plurality of background region moving images. More specifically, the compressed image obtaining section 301 obtains a compressed moving image assigned characteristic region information.

The correspondence analyzing section 302 separates the plurality of characteristic region moving images and the plurality of background region moving images, from the characteristic region information, and supplies the plurality of the characteristic region moving images and the plurality of the background region moving images to the expanding section 320. In addition, the correspondence analyzing section 302 analyzes the characteristic region information, and supplies the position and the characteristic type of the characteristic region to the expansion control section 310. The expansion control section 310 controls the expansion processing of the expanding section 320, according to the position and the characteristic type of the characteristic region obtained from the correspondence analyzing section 302. For example, the expansion control section 310 controls the expanding section 320 to expand each region of the moving image represented by the compressed moving image, according to a compression method having been used by the compression section 230 to compress each region of the moving image according to the position and the characteristic type of the characteristic region.

The following explains the operation of each constituting element of the expanding section 320. The expanding section 320 includes decoders 322a-d (hereinafter collectively referred to as "decoder 322"). The decoder 322 decodes any of the plurality of encoded characteristic region moving images and the plurality of encoded background region moving images. Specifically, the decoder 322a, the decoder 322b, the decoder 322c, and the decoder 322d respectively decode the first characteristic region moving image, the second characteristic region moving image, the third characteristic region moving image, and the background region moving image.

The combining section 330 generates a single display moving image by combining the plurality of characteristic region moving images and the plurality of background region moving images which have been expanded by the expanding section 320. Specifically, the combining section 330 generates a single display moving image by combining the captured images included in the background region moving images and the images of the characteristic regions on the captured images included in the plurality of characteristic region moving images. The output section 340 outputs, to the display apparatus 180 or to the image DB 175, the display moving image and the characteristic region information obtained from the correspondence analyzing section 302. Note that the image DB 175 may record, in a nonvolatile recording medium such as a hard disk, the position, the characteristic type, and the number of characteristic region(s) represented by the characteristic region information, in association with information identifying the captured images included in the display moving image.

Figure 5:
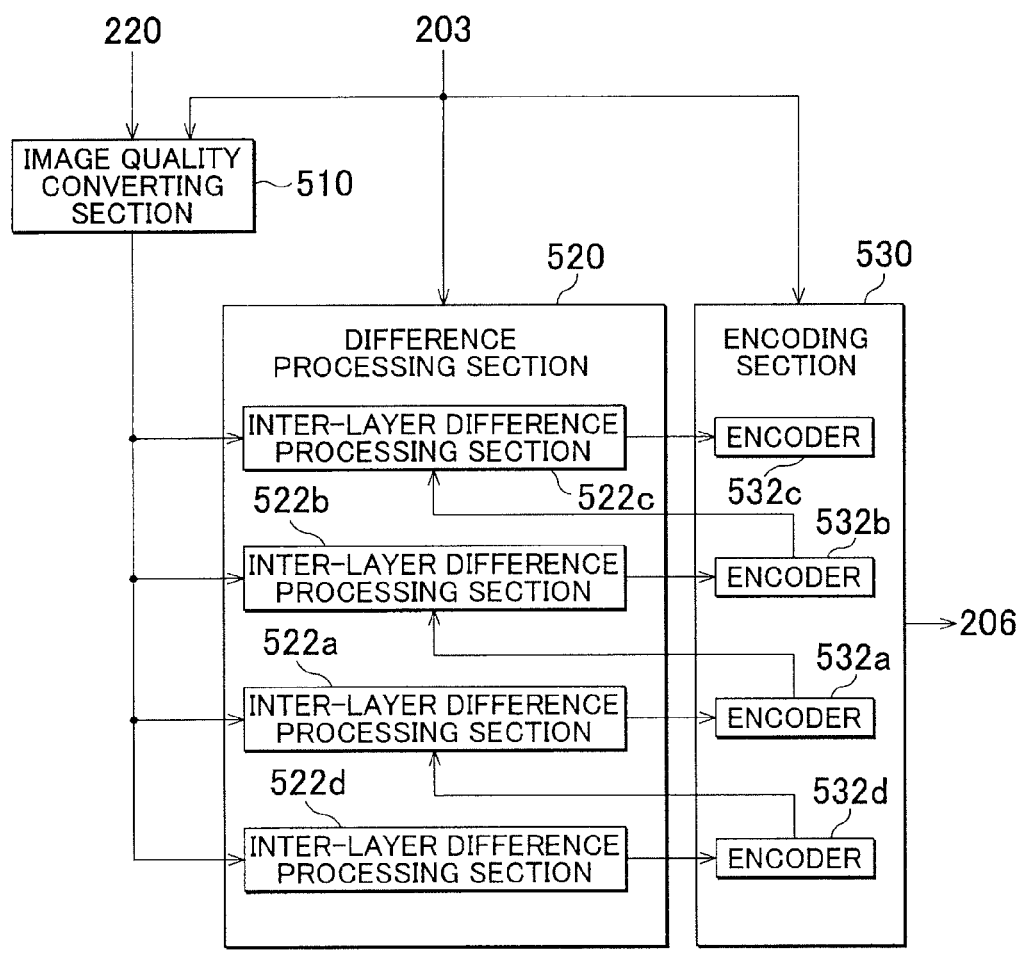
FIG. 5 shows an example of another configuration of the compression section 230.

FIG. 5 shows an example of another block configuration of the compression section 230. The compression section 230 having the present configuration compresses a plurality of captured images by means of coding processing that is spatio scalable according to the characteristic type.

The compression section 230 having the present configuration includes an image quality converting section 510, a difference processing section 520, and an encoding section 530. The difference processing section 520 includes a plurality of inter-layer difference processing sections 522a-d (hereinafter collectively referred to as "inter-layer difference processing section 522"). The encoding section 530 includes a plurality of encoders 532a-d (hereinafter collectively referred to as "encoder 532").

The image quality converting section 510 obtains a plurality of captured images from the image generating section 220. In addition, the image quality converting section 510 obtains information identifying the characteristic region detected by the characteristic region detecting section 203 and the characteristic type of the characteristic region. The image quality converting section 510 then generates the captured images in number corresponding to the number of characteristic types of the characteristic region, by copying the captured images. The image quality converting section 510 converts a generated captured image into an image of resolution according to its characteristic type.

For example, the image quality converting section 510 generates a captured image converted into resolution according to a background region (hereinafter referred to as "low resolution image"), a captured image converted into first resolution according to a first characteristic type (hereinafter referred to as "first resolution image"), a captured image converted into second resolution according to a second characteristic type (hereinafter referred to as "second resolution image"), and a captured image converted into third resolution according to a third characteristic type (hereinafter referred to as "third resolution image"). Here, the first resolution image has higher resolution than the resolution of the low resolution image, and the second resolution image has higher resolution than the resolution of the first resolution image, and the third resolution image has higher resolution than the resolution of the second resolution image.

The image quality converting section 510 supplies the low resolution image, the first resolution image, the second resolution image, and the third resolution image, respectively to the inter-layer difference processing section 522d, the inter-layer difference processing section 522a, the inter-layer difference processing section 522b, and the inter-layer difference processing section 522c. Note that the image quality converting section 510 supplies the moving image to each of the inter-layer difference processing sections 522 as a result of performing the image quality converting processing to each of the plurality of captured images.

Note that the image quality converting section 510 may convert the frame rate of the moving image supplied to each of the inter-layer difference processing sections 522 according to the characteristic type of the characteristic region. For example, the image quality converting section 510 may supply, to the inter-layer difference processing section 522d, the moving image having a frame rate lower than the frame rate of the moving image supplied to the inter-layer difference processing section 522a. In addition, the image quality converting section 510 may supply, to the inter-layer difference processing section 522a, the moving image having a frame rate lower than the frame rate of the moving image supplied to the inter-layer difference processing section 522b, and may supply, to the inter-layer difference processing section 522b, the moving image having a frame rate lower than the frame rate of the moving image supplied to the inter-layer difference processing section 522c. Note that the image quality converting section 510 may convert the frame rate of the moving image supplied to the inter-layer difference processing section 522, by thinning the captured images according to the characteristic type of the characteristic region.

The inter-layer difference processing section 522d and the encoder 532d perform prediction coding on the background region moving image including a plurality of low resolution images. Specifically, the inter-layer difference processing section 522 generates a differential image representing a difference with the predicted image generated from the other low resolution images. Then, the encoder 532d quantizes the conversion coefficient obtained by converting the differential image into spatial frequency component, to encode the quantized conversion coefficient using entropy coding or the like. Note that such prediction coding processing may be performed for each partial region of a low resolution image.

In addition, the inter-layer difference processing section 522a performs prediction coding on the first characteristic region moving image including a plurality of first resolution images supplied from the image quality converting section 510. Likewise, the inter-layer difference processing section 522b and the inter-layer difference processing section 522c respectively perform prediction coding on the second characteristic region moving image including a plurality of second resolution images and on the third characteristic region moving image including a plurality of third resolution images. The following explains the concrete operation performed by the inter-layer difference processing section 522a and the encoder 532a.

The inter-layer difference processing section 522a decodes the first resolution image having been encoded by the encoder 532d, and enlarges the decoded image to an image having a same resolution as the first resolution. Then, the inter-layer difference processing section 522a generates a differential image representing a difference between the enlarged image and the low resolution image. During this operation, the inter-layer difference processing section 522a sets the differential value in the background region to be 0. Then, the encoder 532a encodes the differential image just as the encoder 532d has done. Note that the encoding processing may be performed by the inter-layer difference processing section 522a and the encoder 532a for each partial region of the first resolution image.

When encoding the first resolution image, the inter-layer difference processing section 522a compares the amount of encoding predicted to result by encoding the differential image representing the difference with the low resolution image and the amount of encoding predicted to result by encoding the differential image representing the difference with the predicted image generated from the other first resolution image. When the latter amount of encoding is smaller than the former, the inter-layer difference processing section 522a generates the differential image representing the difference with the predicted image generated from the other first resolution image. When the encoding amount of the first resolution image is predicted to be smaller as it is without taking any difference with the low resolution image or with the predicted image, the inter-layer difference processing section 522a does not have to calculate the difference with the low resolution image or the predicted image.

Note that the inter-layer difference processing section 522a does not have to set the differential value in the background region to be 0. In this case, the encoder 532a may set the data after encoding with respect to the information on difference in the non-characteristic region to be 0. For example, the encoder 532a may set the conversion coefficient after converting to the frequency component to be 0. When the inter-layer difference processing section 522d has performed prediction encoding, the motion vector information is supplied to the inter-layer difference processing section 522a. The inter-layer difference processing section 522a may calculate the motion vector for a predicted image, using the motion vector information supplied from the inter-layer difference processing section 522d.

Note that the operation performed by the inter-layer difference processing section 522b and the encoder 532b is substantially the same as the operation performed by the inter-layer difference processing section 522a and the encoder 532a, except that the second resolution image is encoded, and when the second resolution image is encoded, the difference with the first resolution image after encoding by the encoder 532a may be occasionally calculated, and so is not explained below. Likewise, the operation performed by the inter-layer difference processing section 522c and the encoder 532c is substantially the same as the operation performed by the inter-layer difference processing section 522a and the encoder 532a, except that the third resolution image is encoded, and when the third resolution image is encoded, the difference with the second resolution image after encoding by the encoder 532b may be occasionally calculated, and so is not explained below.

As explained above, the image quality converting section 510 generates, from each of the plurality of captured images, a low image quality image and a characteristic region image having a higher image quality than the low image quality image at least in the characteristic region. The difference processing section 520 generates a characteristic region differential image being a differential image representing a difference between the image of the characteristic region in the characteristic region image and the image of the characteristic region in the low image quality image. Then, the encoding section 530 encodes the characteristic region differential image and the low image quality image respectively.

The image quality converting section 510 also generates low image quality images resulting from lowering the resolution of the plurality of captured images, and the difference processing section 520 generates a characteristic region differential image representing a difference between the image of the characteristic region in the characteristic region image and the image resulting from enlarging the image of the characteristic region in the low image quality image. In addition, the difference processing section 520 generates a characteristic region differential image having a characteristic region and a non-characteristic region, where the characteristic region has a spatial frequency component corresponding to a difference between the characteristic region image and the enlarged image converted into a spatial frequency region, and an amount of data for the spatial frequency component is reduced in the non-characteristic region.

As explained above, the compression section 230 can perform hierarchical encoding by encoding the difference between the plurality of inter-layer images having different resolutions from each other. As can be understood, a part of the compression method adopted by the compression section 230 in the present configuration includes the compression method according to H.264/SVC.

FIG. 6 shows an example of an output image generated from a captured image 600. The image generating section 220 obtains the moving image including the captured images 600-1-18 captured by the image capturing section 200 under various image capturing conditions. In the first period, the image capturing section 200 captures a first set of captured images 600-1-9 captured by changing the image capturing condition from A through I detailed later. In the subsequent second period, the image capturing section 200 captures a second set of captured images 600-10-18 by changing the image capturing condition from A through I again. By repeating the above-stated image capturing, the image capturing section 200 captures a plurality of different sets of captured images respectively under different image capturing conditions.

The image combining section 224 generates an output image 620-1 by overlapping the first set of captured images 600-1-9. The image combining section 224 generates an output image 620-2 by overlapping the second set of captured images 600-10-18. By repeating the above-stated operation, the image combining section 224 generates a single output image 620 from each set of captured images 600, by overlapping the set of captured images 600.

Note that the image combining section 224 may overlap the captured images by weighting them using a predetermined weight coefficient. Note that the weight coefficient may be predetermined according to the image capturing condition. For example, the image combining section 224 may generate an output image 620 by overlapping captured images captured at shorter exposure time by weighting them larger.

Note that the characteristic region detecting section 203 detects the characteristic regions 610-1-18 (hereinafter collectively referred to as "characteristic region 610"), from each of the captured images 600-1-18. Then, the correspondence processing section 206 associates, with the output image 620-1, the information identifying the positions of the characteristic regions 610-1-9 detected from the captured images 600-1-9 used in generating the output image 620-1. In addition, the correspondence processing section 206 associates, with the output image 620-2, the information identifying the characteristic regions 610-10-18 detected from the captured images 600-10-18 used in generating the output image 620-2.

Accordingly, the position of the characteristic region 610 in the first period represented by the output image 620-1 can be known also at the side of the image processing apparatus 170. Therefore, the image processing apparatus 170 can generate a moving image for monitoring purpose which can warn the observer, by performing processing such as enhancing the characteristic region in the output image 620-1.

FIG. 7 shows an example of image capturing conditions A-I. The image capturing control section 210 stores therein a predetermined set of exposure time and aperture value.

For example, the image capturing control section 210 stores therein an image capturing condition E prescribing to pursue image capturing in exposure time T and with a aperture value F. Note that the exposure time length becomes longer as T gets larger, and the aperture opening becomes smaller as F gets larger. In this example, it is assumed that when the light receiving section is exposed at a certain exposure time length, if the aperture value becomes twice, the amount of light received by the light receiving section will be ¼. That is, it is assumed that the amount of light received by the light receiving section is the square of the aperture value.

In the image capturing conditions D, C, B, and A, the exposure time is set to be a value resulting from sequentially dividing T by 2, and the aperture value is set to be a value resulting from sequentially dividing F by the square root of 2. Then, in the image capturing conditions F, G, H, and I, the exposure time is set to be a value resulting from sequentially multiplying 2 by T, and the diaphragm value is set to be a value resulting from sequentially multiplying the square root of 2 by F. In this way, the image capturing conditions A-I stored in the image capturing control section 210 are such as yielding substantially the same exposure time in the light receiving section, by different sets of exposure time and aperture value.

The image capturing control section 210 periodically changes the image capturing condition by successively changing the image capturing condition of the image capturing section 200 according to the image capturing conditions A-I stored in the image capturing control section 210, as explained with reference to FIG. 6. When pursuing the image capturing under the explained image capturing condition, the brightness of the captured image 600 in the same image region will be substantially the same regardless of the image capturing condition, if there is no change in brightness of the subject. Therefore, the image capturing apparatus 100 can provide a moving image having a small amount of flickering even when the plurality of captured images are successively displayed.

In addition, when the image capturing section 200 has captured an image at a shorter exposure time such as under the image capturing condition A, the instability of the subject image corresponding to the moving body moving in high speed can occasionally be alleviated. In addition, when the image capturing section 200 has captured an image at a larger aperture value such as under the image capturing condition I, the depth of field becomes large, which may occasionally enable, to be enlarged, the region in which a clear subject image can be obtained. Accordingly, the probability of failing to detect the characteristic region in the characteristic region detecting section 203 can be reduced. In addition, the image capturing apparatus 100 can occasionally incorporate the image information of a clear subject image with little instability or blurring in the output image 620. Note that as stated above, the image capturing control section 210 may control the image capturing section 200 to capture an image by changing various image capturing conditions such as focus position and resolution, not limited to the image capturing condition of exposure time and aperture value.

Figure 8:
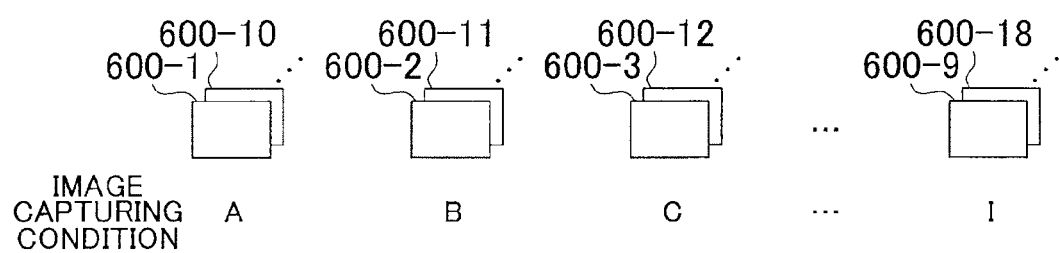
FIG. 8 shows an example of a set of captured images 600 compressed by the compression section 230.

FIG. 8 shows an example of a set of captured images 600 compressed by the compression section 230. The compression section 230 compresses a moving image composed of a plurality of captured image 600-1, captured image 600-10, . . . captured under the image capturing condition A. In addition, the compression section 230 compresses a moving image composed of a plurality of captured image 600-2, captured image 600-11, . . . captured under the image capturing condition B. In addition, the compression section 230 compresses a moving image composed of a plurality of captured image 600-3, captured image 600-12, . . . , captured under the image capturing condition C. In this way, the compression section 230 compresses the captured images 600 captured under different image capturing conditions from each other, as different moving images from each other.

In this way, the compression section 230 compresses a plurality of captured moving images separately from each other, where each captured moving image includes a plurality of images captured under the same image capturing condition. Normally, as the image capturing condition changes, the change in subject image (e.g., change in the amount of instabilities of the subject image or change in brightness in the subject image) will get large, however, such change in subject image is substantially smaller for the captured images 600 captured under the same image capturing condition. Accordingly, the compression section 230 can substantially reduce the data amount of each set of capturing moving images by prediction coding such as MPEG coding.

Note that when thus divided captured moving image is transmitted to the image processing apparatus 170, so that the display apparatus 180 can display the captured images included in each captured moving image in the captured order in an appropriate manner, it is desirable to assign, to each captured moving image, timing information representing a timing at which each captured image is to be displayed. In addition, when the images are captured under an image capturing condition that would render different brightness for each image, unlike the image capturing condition explained with reference to FIG. 7, the luminance adjusting section 228 may adjust the luminance of the captured images according to the image capturing condition, before supplying them to the compression section 230. In addition, the compression section 230 may compress a moving image including a plurality of captured images matching a predetermined condition selected by the image selecting section 226.

FIG. 9 shows another example of the image capturing conditions. The image capturing control section 210 stores different sets of predetermined exposure time and predetermined aperture value, as a parameter defining the image capturing condition of the image capturing section 200.

Specifically, the image capturing section 200 is assumed to be able to pursue image capturing with three predetermined different exposure time lengths, i.e., T/2, T, 2T, and three predetermined aperture values, i.e., F/2, F, 2F. In this case, the image capturing control section 210 pre-stores nine combinations of exposure time and aperture value, different from each other. Then the image capturing control section 210 successively changes the plurality of image capturing conditions defined by different combinations of the illustrated image capturing parameters, as explained with reference to FIG. 6.

FIG. 10 shows a further different example of the image capturing conditions. The image capturing control section 210 stores different sets of predetermined exposure time, predetermined aperture value, and predetermined gain characteristics defining the image capturing condition of the image capturing section 200.

Specifically, the image capturing section 200 is assumed to be able to pursue image capturing with three predetermined different exposure time lengths, i.e., T/2, T, 2T, three predetermined aperture values, i.e., F/2, F, 2F, and three predetermined gain characteristics. The recitation "under," "over," and "normal" in the drawing respectively represent the gain characteristics that results in low exposure, the gain characteristics that results in high exposure, and the gain characteristics that results in none of low exposure and high exposure. In this case, the image capturing control section 210 pre-stores twenty seven combinations of exposure time, aperture value, and gain characteristics, different from each other.

An exemplary indicator of the gain characteristics is a gain value itself. Another exemplary indicator of the gain characteristics is a gain curve for adjusting luminance in a non-linear manner, with respect to the inputted image capturing signal. The luminance adjustment may be performed in a stage prior to AD conversion processing for converting an analogue image capturing signal into a digital image capturing signal. Alternatively, the luminance adjustment may be incorporated in the AD conversion processing.

In this way, the image capturing section 200 further successively capture a plurality of captured images by performing gain adjustment on the image capturing signal, using different gain characteristics. Then, the image capturing section 200 successively captures a plurality of images using different combinations of exposure time, aperture opening, and gain characteristics. The image capturing control section 210 successively changes the plurality of image capturing conditions defined by the illustrated different combination of the image capturing parameters, as explained with reference to FIG. 6.

As explained with reference to FIG. 9 and FIG. 10, the image capturing section 200 can obtain a subject image captured under various image capturing conditions. Therefore, even when subjects different in brightness or moving speed exist in an image angle, the possibility of obtaining a clear image of each subject can be enhanced in any of the plurality of obtained frames. Accordingly, the probability of failing to detect the characteristic region in the characteristic region detecting section 203 can be reduced. In addition, the image information of a clear subject image with little instability or blurring may be occasionally incorporated in the output image 620.

In the examples of FIG. 9 and FIG. 10, each image capturing parameter stored in the image capturing control section 210 was in three levels. However, at least one image capturing parameter stored in the image capturing control section 210 may have two levels, or four or more levels. In addition, the image capturing control section 210 may control the image capturing section 200 to capture an image by changing the combination of various image capturing conditions such as focal position and resolution.

The image capturing section 200 may also successively capture a plurality of images under different image capturing conditions defined by various processing parameters with respect to an image capturing signal, instead of gain characteristics. Examples of such processing parameters include sharpness processing using different sharpness characteristics, whiteness balance processing using different whiteness balance characteristics, color synchronization using different color synchronization properties as indicators, resolution conversion processing using different degrees of output resolution, and compression processing using different degrees of compression. Moreover, an example of the compression processing is image quality reduction processing using a particular image quality as an indicator, e.g., gradation number reducing processing using gradation as an indicator. Another example of the compression processing is a capacity reduction processing using the data capacity such as the amount of encoding as an indicator.

FIG. 11 shows an example of an operation parameter used in overlapping processing performed by the image combining section 224. This drawing shows examples of operation parameters used by the image combining section 224 in performing overlapping processing for overlapping a plurality of captured images obtained using the set of image capturing conditions A-I.

An example of the overlapping processing performed by the image combining section 224 is weighted averaging processing of pixel values. The operation parameter for weighted averaging processing includes a weight coefficient showing the size of the weight to be added in performing weighted addition on the pixel values of the plurality of captured images and the dividing coefficient by which the pixel values added with the weight shown by the weight coefficient is divided. The example of the drawing shows an operation parameter used in nine operation patterns shown by a-i, which are stored in the image combining section 224.

The operation pattern a is used in simple averaging of a captured image. In the operation pattern a, nine captured images obtained by the combinations of image capturing conditions A-I, are weighted averaged at the same weight coefficient of 1.

The following explains a concrete example of image capturing condition. The following example takes exposure time and aperture value as image capturing parameters used for image capturing under different image capturing conditions. The exposure time is changed among the three patterns of 2T, T, T/2, and the aperture value is changed among the three patterns of F, $(2)^{1/2}F$, 2F. Nine different captured images under different image capturing conditions are obtained by combinations of three exposure periods and three aperture values. As explained below, the captured images have different characteristics from each other, according to the exposure time and the size of the aperture value at the time of image capturing. For simplifying the explanation, the focal length is assumed to be constant, and the aperture value is assumed to show the size of the diaphragm.

For example, the image capturing condition A yields the brightest captured image. The image capturing condition I yields the darkest captured image. The size of brightness of captured images obtained according to each image capturing condition is shown by the inequality sign as: I<F, H<C, E, G<B, D<A. Specifically, using the amount of incident light (amount of exposure) to the image capturing apparatus 100 as a brightness indicator, the captured image obtained under the image capturing condition A has 16 times brighter than the captured image obtained under the image capturing condition I.

When the image capturing environment is extremely dark, the captured image obtained under the image capturing condition A having the largest amount of incident light may be occasionally more suited as the output image. On the other hand, when the image capturing environment is sufficiently bright (e.g., when the amount of illumination is sufficient), the captured image obtained according to the image capturing condition A may have white out. In such a case, the captured image obtained under the image capturing condition I will have adequate brightness, and may be more suitable as an output image. Therefore, by selectively using these captured images, the dynamic range can be substantially widened. As detailed later, the image combining section 224 can control the above-mentioned weight coefficient, to control the selection of these captured images. For example, the image combining section 224 can obtain an output image having adequate brightness, by controlling the weight coefficient for each captured image according to the brightness of the image capturing environment.

On the other hand, when there is relative movement between a subject and an image capturing apparatus 100, the instability of the subject image will be larger when the exposure time gets longer. In addition, as the diaphragm gets smaller, the blurring of the subject image will be larger. Therefore, combinations of image capturing parameters that yield the same level of brightness as each other may result in different characteristics of the image from each other.

For example, using the amount of incident light as an indicator for brightness, when the image capturing conditions C, E, and G are used in image capturing, the captured images of the same brightness can be obtained. Under the image capturing condition C, the resulting captured image will have relatively large instability, while having little blurring. On the other hand, according to the image capturing condition G, the resulting captured image will have relatively large blurring, while having little instability. The size of blurring and instability of the image capturing condition E is between that of the image capturing condition C and that of the image capturing condition G.

Therefore, when the subject moves, the captured image obtained under the image capturing condition G or the image capturing condition E may be more suitable as an output image, since they have smaller instability than the captured image obtained under the image capturing condition C. When the subject does not move, the captured image obtained under the image capturing condition C may be more suitable as an output image, since it has smaller blurring than the captured image captured under the image capturing condition G. Therefore, the image combining section 224 may obtain a more suitable output image by controlling the weight coefficient for the captured image, for example according to the movement of the subject.

Then, for which of the image capturing conditions the assigned weight is to be increased is determined according to the characteristic assigned importance. The following explains the weighted averaging processing using several operation patterns shown as examples.

The operation pattern b shows an example of operation parameter for averaging the brightness evenly throughout the entire image. The processing is for averaging the pixel values of the captured image whose brightness has been normalized according to the amount of incident light.

The operation pattern c shows an example of operation parameter for averaging three captured images having the same brightness. As explained above, the weight coefficient difference may be further larger for the three captured images, according to which problem of blurring and instability is assigned importance and how much.

The operation pattern d shows an example of operation parameter used in a case in which the captured images of intermediate brightness are assigned importance. The captured images obtained under the image capturing conditions C, E, G are assigned more importance than the captured images obtained under the other image capturing conditions. The captured images that have the maximum brightness or the minimum brightness are not assigned importance (e.g., captured images obtained under the image capturing conditions A and B). According to the operation pattern d, even when the captured image obtained under the image capturing condition A has resulted to have white out, the weight of the portions with respect to the captured image is relatively small such as $\frac{1}{22}$, which may occasionally allow an output image substantially without any white out, In addition, the weight to the image capturing condition I will also be relatively small, and so an output image having small quantization noise may be obtained.

The operation pattern e shows an example of operation parameter in a case where the instability prevention is assigned more importance. With the operation parameter e, a larger weight can be assigned to a captured image obtained in shorter exposure time. When the exposure time is the same, the captured image obtained with a smaller aperture value is assigned a larger weight. Therefore, a brighter and clearer captured image will be assigned more importance.

The operation pattern f shows an example of operation parameter in a case where the blurring prevention is assigned more importance. With the operation pattern f, the captured image obtained with a larger aperture value is assigned a larger weight. When the aperture value is the same, a captured image obtained in a longer exposure time is assigned a larger weight. Therefore, a brighter and clearer captured image will be assigned more importance.

The operation pattern g shows an example of operation parameter in a case where prevention of black out is assigned more importance. With the operation pattern g, the captured image obtained under an image capturing condition yielding a larger amount of incident light is assigned a larger weight. This may prevent black out and may have a possibility of obtaining an output image having small quantization noise.

The operation pattern h shows an example of operation parameter in a case where prevention of white out is assigned more importance. With the operation pattern h, the captured image obtained under an image capturing condition yielding a smaller amount of incident light is assigned a larger weight. This may prevent white out in an output image.

The operation pattern i shows an example of operation parameter in a case where the prevention of black out and white out is assigned particular importance. The image combining section 224 detects existence of white out (over) and black out (under). The image combining section 224 sets the weight coefficient for the captured image in which no white out or black out has been detected, to be larger than the weight coefficient for the captured image in which white out or black out has been detected. In the example of this drawing, the weight coefficient for the captured image in which no white out or black out has been detected is set to be 1, and the weight coefficient for the captured image in which white out or black out has been detected is set to be 0.

Note that the image combining section 224 may count the number of pixels of the captured image having a pixel value exceeding a predetermined pixel value (e.g., luminance value of 250), to detect the existence of white out when the counted number of pixels exceeds a predetermined threshold value. The image combining section 224 may count the number of pixels of the captured image having a pixel value below a predetermined pixel value (e.g., luminance value of 5), to detect the existence of black out when the counted number of pixels exceeds a predetermined threshold value. Note that the threshold value may be a value according to the number of pixels included in the captured image, e.g., may be a value proportional to the number of pixels in the captured image. The predetermined pixel value may also be a value according to the number of gradations.

Note that the overlapping operation using the operation parameter of the operation pattern b is addition of the captured image normalized with respect to the amount of incident light, while the amount of incident light was not normalized in the overlapping operation using the operation parameter of the operation patterns c-i. The normalization processing may be added to the amount of incident light when the overlapping is performed using the operation parameter of the operation patterns c-i. For example, the image combining section 224 may perform weighting using any of the operation parameters of the operation patterns c-i after performing weighting using the operation parameter of the operation pattern b, or perform weighting using the operation parameter of the operation pattern b after performing weighting using any of the operation parameters of the operation patterns c-i. Needless to say, the image combining section 224 may perform weighted averaging processing using the weight coefficient resulting from multiplying any of the operation parameter of the operation pattern b and any of the operation parameters of the operation patterns c-i.

In the above explanation, to make the explanation easier, the operation parameters are explained independently from each other, for each of the instability, the blurring, and the other problems to be assigned importance. However needless to say, it is also possible to determine the operation parameter according to the degree of importance of these problems (e.g., degree of importance of blurring, degree of importance of instability), by means of processing similar to the processing to add the normalization effect of the amount of incident light to the other operation patterns c-i.

As explained above with reference to FIG. 11, the image combining section 224 may generate the output image by giving weight to the captured image according to the combination of image capturing conditions. For example, the captured image may be given weight depending on which of the instability, the blurring, white out, black out, and brightness should be assigned importance, or the degree of importance of them. Accordingly, an output image having a desirable image quality depending on the illumination environment, the motion of the subject, the size of the subject, and the brightness of the subject may be generated.

The image capturing system 10 explained above can reduce the probability of failing to detect the characteristic regions. In addition, the image capturing system 10 can provide a monitoring moving image excellent in visibility while reducing the amount of data.

Figure 12:
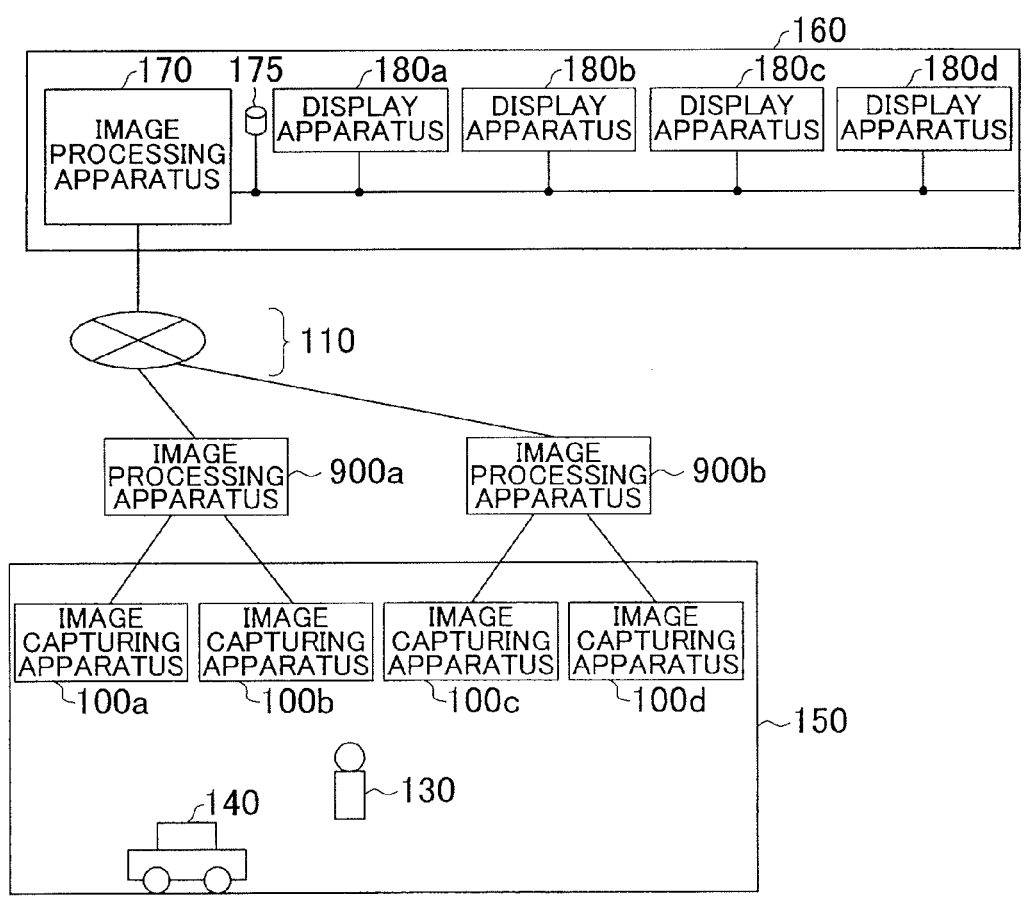
FIG. 12 shows an example of an image capturing system 20 according to another embodiment.

FIG. 12 shows an example of an image capturing system 20 according to another embodiment. The configuration of the image capturing system 20 according to the present embodiment is the same as the image capturing system 10 explained with reference to FIG. 1, except that the image processing apparatus 900a and the image processing apparatus 900b (hereinafter collectively referred to as "image processing apparatus 900") are further included.

The image capturing apparatus 100 having the present configuration has a function of the image capturing section 200, from among each constituting element of the image capturing apparatus 100 explained with reference to FIG. 2. The image processing apparatus 900 includes the other constituting elements than the image capturing section 200 from among each constituting element of the image capturing apparatus 100 explained with reference to FIG. 2. Since the function and operation of the image capturing section 200 included in the image capturing apparatus 100 as well as the function and operation of each constituting element included in the image processing apparatus 900 are the same as the function and operation of each constituting element of the image capturing system 10 explained with reference to FIGS. 1 through 11, they are not explained below. With the image capturing system 20, too, substantially the same effect as explained above with reference to the image capturing system 10 explained with reference to FIGS. 1 through 11 can be obtained.

Figure 13:
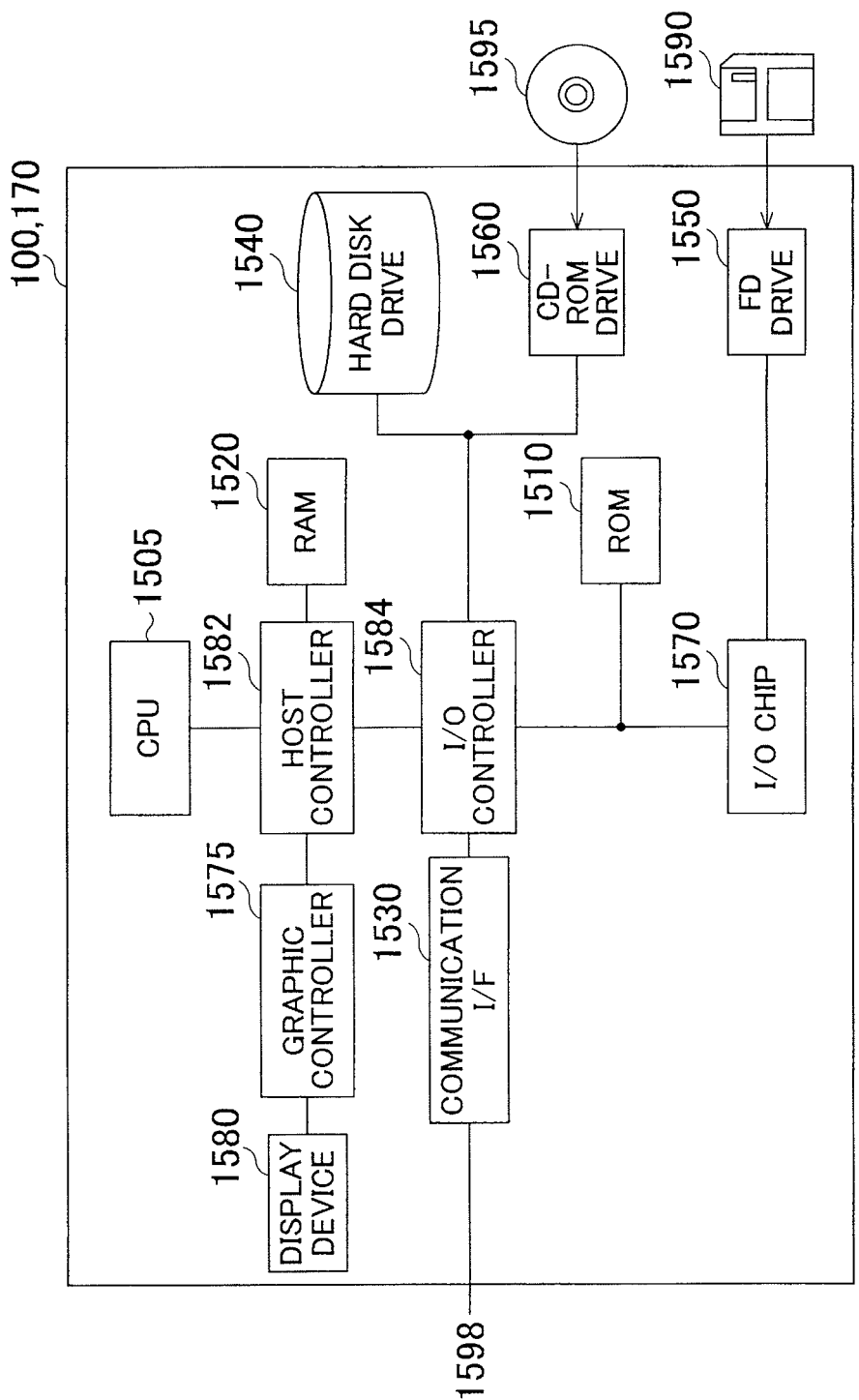
FIG. 13 shows an example of a hardware configuration of the image capturing apparatus 100 and the image processing apparatus 170.

FIG. 13 shows an example of a hardware configuration of the image capturing apparatus 100 and the image processing apparatus 170. The image capturing apparatus 100 and the image processing apparatus 170 include a CPU peripheral section, an input/output section, and a legacy input/output section. The CPU peripheral section includes a CPU 1505, a RAM 1520, a graphic controller 1575, and a display device 1580 connected to each other by a host controller 1582. The input/output section includes a communication interface 1530, a hard disk drive 1540, and a CD-ROM drive 1560, all of which are connected to the host controller 1582 by an input/output controller 1584. The legacy input/output section includes a ROM 1510, a flexible disk drive 1550, and an input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer provided inside the RAM 1520 and displays the image data in the display device 1580. Alternatively, the graphic controller 1575 may internally include the frame buffer storing the image data generated by the CPU 1505 or the like.

The input/output controller 1584 connects the communication interface 1530 serving as a relatively high speed input/output apparatus, the hard disk drive 1540, and the CD-ROM drive 1560 to the host controller 1582. The hard disk drive 1540 stores the programs and data used by the CPU 1505. The communication interface 1530 transmits or receives programs and data by connecting to the network communication apparatus 1598. The CD-ROM drive 1560 reads the programs and data from a CD-ROM 1595 and provides the read programs and data to the hard disk drive 1540 and to the communication interface 1530 via the RAM 1520.

Furthermore, the input/output controller 1584 is connected to the ROM 1510, and is also connected to the flexible disk drive 1550 and the input/output chip 1570 serving as a relatively low speed input/output apparatus. The ROM 1510 stores a boot program executed when the image capturing apparatus 100 and the image processing apparatus 170 start up, a program relying on the hardware of the image capturing apparatus 100 and the image processing apparatus 170, and so on. The flexible disk drive 1550 reads programs or data from a flexible disk 1590 and supplies the read programs or data to the hard disk drive 1540 and to the communication interface 1530 via the RAM 1520. The input/output chip 1570 is connected to a variety of input/output apparatuses via the flexible disk drive 1550, and a parallel port, a serial port, a keyboard port, a mouse port, or the like, for example.

A program executed by the CPU 1505 is supplied by a user by being stored in a recording medium such as the flexible disk 1590, the CD-ROM 1595, or an IC card. The program may be stored in the recording medium either in a decompressed condition or a compressed condition. The program is installed via the recording medium to the hard disk drive 1540, and is read by the RAM 1520 to be executed by the CPU 1505. The program executed by the CPU 1505 causes the image capturing apparatus 100 to function as each constituting element of the image capturing apparatus 100 explained with reference to FIGS. 1 through 12, and causes the image processing apparatus 170 to function as each constituting element of the image processing apparatus 170 explained with reference to FIGS. 1 through 12.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the image capturing apparatus 100 and the image processing apparatus 170 via the network. In this way, a computer controlled by a program functions as the image capturing apparatus 100 and the image processing apparatus 170.

Although some aspects of the present invention have been described by way of exemplary embodiments, it should be understood that those skilled in the art might make many changes and substitutions without departing from the spirit and the scope of the present invention which is defined only by the appended claims.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. An image capturing apparatus comprising:
   an image capturing section that successively captures a plurality of images under a plurality of image capturing conditions set to have different exposure time lengths and aperture openings from each other and result in a same amount of exposure as each other;
   an image generating section that generates an output image by overlapping the plurality of captured images captured under the plurality of image capturing conditions; and
   an output section that outputs the output image generated by the image generating section;
   wherein the image generating section generates the output image by averaging pixel values of the plurality of captured images; and
   wherein the image generating section generates a plurality of output images from the plurality of captured images respectively captured in different periods by the image capturing section, and
   the output section outputs an output moving image including the plurality of output images as moving image constituting images.

2. The image capturing apparatus according to claim 1, wherein
   the image capturing section successively captures the plurality of captured images by different combinations of the exposure time lengths and the aperture openings.

3. The image capturing apparatus according to claim 1, wherein
   the image capturing section successively captures the plurality of captured images by gain adjusting an image capturing signal by different gain characteristics from each other.

4. The image capturing apparatus according to claim 3, wherein
   the image capturing section successively captures the plurality of captured images by different combinations of the exposure time lengths, the aperture openings, and the gain characteristics.

5. The image capturing apparatus according to claim 1, wherein
   the image capturing section successively captures the plurality of captured images having different resolutions from each other.

6. The image capturing apparatus according to claim 1, wherein
   the image capturing section successively captures the plurality of captured images having different numbers of colors from each other.

7. The image capturing apparatus according to claim 1, wherein
   the image capturing section successively captures the plurality of captured images having been focused on different positions from each other.

8. The image capturing apparatus according to claim 7, further comprising:
   a characteristic region detecting section that detects a characteristic region from each of the plurality of captured images; and
   a characteristic region position predicting section that, based on a position of the characteristic region detected from each of the plurality of captured images, predicts a position of the characteristic region at a timing later than a timing at which the plurality of captured images have been captured, wherein
   the image capturing section successively captures the plurality of captured images by focusing on the predicted position of the characteristic region having been predicted by the characteristic region position predicting section.

9. The image capturing apparatus according to claim 1, wherein the image generating section generates the output image by selecting, for each of a plurality of image regions, a captured image, from among the plurality of captured images, which includes the image region that matches a predetermined condition, and combining images of the plurality of image regions in the selected captured images.

10. The image capturing apparatus according to claim 1, further comprising:
a characteristic region detecting section that detects a characteristic region from each of the plurality of captured images captured under the plurality of image capturing conditions, wherein
the output section outputs, in association with the output image, characteristic region information representing the characteristic region detected by the characteristic region detecting section.

11. The image capturing apparatus according to claim 10, further comprising:
a compression section that compresses each of the plurality of captured images by differing degrees of compression between the characteristic region of the plurality of captured images and a background region in the plurality of captured images that is not the characteristic region, wherein
the output section further outputs the compressed captured images.

12. The image capturing apparatus according to claim 11, wherein
the compression section includes:
an image dividing section that divides the characteristic region from the background region in the plurality of captured images; and
a compression processing section that compresses an image of the characteristic region at a different degree from a degree at which an image of the background region is compressed.

13. The image capturing apparatus according to claim 12, wherein
the image dividing section divides the characteristic region from the background region in each of the plurality of captured images, and
the compression processing section compresses a characteristic region moving image including a plurality of characteristic region images and a background region moving image including a plurality of background region images, at different degrees from each other.

14. The image capturing apparatus according to claim 11, wherein
the compression section includes:
an image quality converting section that generates, from each of the plurality of captured images, a low image quality image and a characteristic region image having a higher image quality than the low image quality image at least in the characteristic region;
a difference processing section that generates a characteristic region differential image being a differential image representing a difference between an image of the characteristic region in the characteristic region image and an image of the characteristic region in the low image quality image; and
an encoding section that encodes the characteristic region differential image and the low image quality image, respectively.

15. The image capturing apparatus according to claim 14, wherein
the image quality converting section generates the low image quality image whose resolution is lower than resolution of the plurality of captured images; and
the difference processing section generates the characteristic region differential image representing a difference between the image of the characteristic region in the characteristic region image and an image resulting from enlarging the image of the characteristic region in the low image quality image.

16. The image capturing apparatus according to claim 15, wherein
the difference processing section generates a characteristic region differential image having a characteristic region and a non-characteristic region that is not the characteristic region, where the characteristic region has a spatial frequency component corresponding to a difference between the characteristic region image and the image having been enlarged, and an amount of data for the spatial frequency component for the non-characteristic region is reduced.

17. The image capturing apparatus according to claim 1, further comprising:
an image capturing control section that stores therein a predetermined plurality of image capturing conditions.

18. The image capturing apparatus according to claim 1, further comprising:
an image capturing control section that stores therein predetermined sets of exposure times and aperture values as the plurality of image capturing conditions.

19. An image capturing apparatus comprising:
an image capturing section that successively captures a plurality of images under a plurality of image capturing conditions set to have different exposure time lengths and aperture openings from each other and result in a same amount of exposure as each other;
an image generating section that generates an output image by overlapping the plurality of captured images captured under the plurality of image capturing conditions; and
an output section that outputs the output image generated by the image generating section;
wherein the image generating section generates the output image by averaging pixel values of the plurality of captured images; and
wherein the image generating section generates a plurality of output images from the plurality of captured images respectively captured in different periods by the image capturing section, and
the output section outputs an output moving image including the plurality of output images as moving image constituting images, wherein
the image generating section generates a first output image from the plurality of captured images captured under a plurality of image capturing conditions different from each other in a first period, and generates a second output image from the plurality of captured images captured under a plurality of image capturing conditions that are the same as the plurality of image capturing conditions adopted in the first period.

20. An image capturing method, comprising:
successively capturing a plurality of images under a plurality of image capturing conditions set to have different exposure time lengths and aperture openings from each other and result in a same amount of exposure as each other;
generating an output image by overlapping the plurality of captured images captured under the plurality of image capturing conditions; and outputting the output image having been generated;

wherein generating the output image comprises generating the output image by averaging pixel values of the plurality of captured images and generating a plurality of output images from the plurality of captured images respectively captured in different periods by the image capturing, and outputting the output image comprises outputting a moving output image including the plurality of output images as moving image constituting images.

21. A non-transitory computer readable medium storing therein a program for an image capturing apparatus, the program causing a computer to function as:

an image capturing section that successively captures a plurality of images under a plurality of image capturing conditions set to have different exposure time lengths and aperture openings from each other and result in a same amount of exposure as each other;

an image generating section that generates an output image by overlapping the plurality of captured images captured under the plurality of image capturing conditions; and an output section that outputs the output image generated by the image generating section;

wherein the image generating section generates the output image by averaging pixel values of the plurality of captured images; and wherein the image generating section generates a plurality of output images from the plurality of captured images respectively captured in different periods by the image capturing section, and the output section outputs an output moving image including the plurality of output images as moving image constituting images.

* * * * *